(12) United States Patent
Rakotovao et al.

(10) Patent No.: US 10,103,605 B2
(45) Date of Patent: Oct. 16, 2018

(54) POLYPHASE ELECTRIC MOTOR WITH DEVICE FOR DETERMINATION OF ANGULAR POSITION AND/OR SPEED OF ROTATION OF ROTOR OF THE MOTOR

(71) Applicant: VALEO EQUIPEMENTS ELECTRIQUES MOTEUR, Creteil (FR)

(72) Inventors: Mamy Rakotovao, Vitry sur Seine (FR); Khadija El Baraka, Bussy St Georges (FR); Svetislav Jugovic, Juvisy-sur-Orge (FR)

(73) Assignee: Valeo Equipements Electriques Moteur, Creteil (FR)

( * ) Notice: Subject to any disclaimer, the term of this patent is extended or adjusted under 35 U.S.C. 154(b) by 166 days.

(21) Appl. No.: 15/021,189

(22) PCT Filed: Aug. 26, 2014

(86) PCT No.: PCT/FR2014/052126
§ 371 (c)(1),
(2) Date: Mar. 10, 2016

(87) PCT Pub. No.: WO2015/040299
PCT Pub. Date: Mar. 26, 2015

(65) Prior Publication Data
US 2016/0226350 A1    Aug. 4, 2016

(30) Foreign Application Priority Data
Sep. 20, 2013    (FR) ...................................... 13 59069

(51) Int. Cl.
*H02K 11/215*    (2016.01)
*H02K 29/08*    (2006.01)
(Continued)

(52) U.S. Cl.
CPC ............. *H02K 11/215* (2016.01); *H02K 1/12* (2013.01); *H02K 1/27* (2013.01); *H02K 29/08* (2013.01); *H02K 3/522* (2013.01)

(58) Field of Classification Search
CPC . H02K 1/12; H02K 1/27; H02K 11/00; H02K 11/21; H02K 11/215; H02K 29/08
See application file for complete search history.

(56) References Cited

U.S. PATENT DOCUMENTS 5,066,880 A * 11/1991 Banon .................. H02K 1/2773
310/156.55
5,091,668 A *  2/1992 Cuenot ................ H02K 1/2773
310/156.61
(Continued)

FOREIGN PATENT DOCUMENTS

| FR | 2872644 | 1/2006 |
|---|---|---|
| JP | 2010200418 | 9/2010 |
| WO | WO2013065577 | 5/2013 |

*Primary Examiner* — Tran Nguyen
(74) *Attorney, Agent, or Firm* — Berenato & White, LLC

(57) ABSTRACT

A polyphase electric motor (1) of a motor vehicle which includes a rotor (6) and a stator (2, 5, 13) surrounding the rotor and including a plurality of stator windings (5) around stator teeth (4, 19) defined by notches (3) in a stator magnetic mass (2). According to the invention, the motor includes a device for determining an angular position (17) and/or the speed of rotation of the rotor, including a plurality of magnetic field sensors (18) which are stationary relative to the stator. The sensors are arranged in notches (3) and comprise large casing surfaces extending in planes that are tangential to the stator magnetic mass, such that the sensors detect only a radial component of the magnetic field inside the stator magnetic mass.

18 Claims, 4 Drawing Sheets

(51) Int. Cl.
  *H02K 1/12* (2006.01)
  *H02K 1/27* (2006.01)
  H02K 3/52 (2006.01)

(56) References Cited

U.S. PATENT DOCUMENTS

| | | | | |
|---|---|---|---|---|
| 6,323,572 | B1* | 11/2001 | Kinoshita | H02K 1/2766 310/156.07 |
| 7,388,310 | B2* | 6/2008 | Abou-Akar | H02K 1/2773 310/156.48 |
| 7,944,168 | B2* | 5/2011 | Chemin | G01D 5/24409 318/400.02 |
| 8,004,140 | B2* | 8/2011 | Alexander | H02K 1/2773 310/156.48 |
| 2008/0252160 | A1* | 10/2008 | Kavalsky | H01R 13/6658 310/71 |

* cited by examiner

POLYPHASE ELECTRIC MOTOR WITH DEVICE FOR DETERMINATION OF ANGULAR POSITION AND/OR SPEED OF ROTATION OF ROTOR OF THE MOTOR

CROSS-REFERENCE TO RELATED APPLICATIONS AND CLAIM TO PRIORITY

This application is a national stage application of International Application No. PCT/FR2014/052126 filed Aug. 26, 2014, which claims priority to French Patent Application No. 1359069 filed Sep. 20, 2013, the disclosures of which are incorporated herein by reference and to which priority is claimed.

FIELD OF THE INVENTION

The present invention relates to a device for determination of the angular position and/or the speed of rotation of a rotor of a polyphase electric motor of a motor vehicle. The invention also relates to an electric motor provided with a device of this type, in particular for applications as an electric traction motor in electric and hybrid motor vehicles.

BACKGROUND OF THE INVENTION

As a result of their increased performance in terms of output and specific power and power density, synchronous machines with permanent magnets nowadays have an extensive application in the field of motor vehicles.

These electrical machines can be produced in a wide range of powers and speeds, and have applications both in vehicles of the all-electric type and in vehicles with low $CO_2$ emission, of the types known as mild-hybrid and full-hybrid.

The mild-hybrid applications generally relate to electrical machines of approximately 8 to 10 kW, for example an electric motor fitted on the front face of a thermal engine, and coupled to the latter by a drive belt. By means of an electric motor of this type, it is possible to reduce the capacity of the thermal motorisation (engine downsizing) by providing electric torque assistance which supplies additional power, in particular when restarting. In addition, traction at low speed, for example in an urban environment, can also be ensured by this same electric motor.

Applications of the full-hybrid type generally relate to 25 to 50 kW motors for architectures of the series and/or parallel type, with more refined integration of the electric motor(s) in the traction chain of the vehicle, in particular at the level of the clutch.

The remarkable performance levels of the present machines with permanent magnets are to a large extent due to rotors which have a so-called "flux concentration" structure which makes it possible to obtain substantial magnetic fluxes with magnets obtained from sintered or bonded ferrites.

In these machines, the stator surrounds the rotor, and its magnetic mass has a series of notches, generally parallel to the axis of rotation, delimiting teeth around which there are formed windings which create the rotary magnetic fields that drive the rotor.

The control of an inverter which supplies the stator windings from on-board direct current supply sources requires knowledge of the angular position of the rotor relative to the stator, as well as of the speed of rotation and other parameters.

For this purpose, certain electrical machines which are used in the motor vehicle industry are equipped with a device known as a "resolver" arranged at the end of the rotor shaft.

A resolver of this type itself comprises a rotor and a stator which are fixed respectively relative to the rotor and the stator of the machine.

However, this type of equipment has disadvantages, in particular its cost, and the company VALEO EQUIPMENTS ELECTRIQUES MOTEUR has proposed in patent application FR2872644 another device for determination of the angular position of the rotor.

The device described does not involve any costly equipment, since the magnetic field is supplied directly, either by the rotor of the machine itself, or by a magnetic target secured on the shaft.

Means for processing first signals emitted by Hall-effect sensors provide second signals which are representative of the angular position of the rotor and of the speed of rotation, and other information which is useful for the functioning of the inverter.

However, when implementing this device, the inventive body found that it was relatively difficult to process the first signals in order to obtain satisfactory precision relating to the angular position of the rotor in all cases, and to eliminate the parasitic influences completely.

SUMMARY OF THE INVENTION

The objective of the present invention is thus to optimise the detection of the magnetic field of a rotor, in order to improve the determination of the angular position of this rotor relative to the stator.

According to a first aspect, the invention relates to a polyphase electric motor of a motor vehicle comprising a rotor and a stator surrounding the rotor, and comprising a plurality of stator windings around stator teeth which are delimited by notches in a magnetic stator mass.

According to the invention, the motor comprises a device for determination of an angular position and/or the speed of rotation of the rotor, of the type comprising a plurality of magnetic field sensors which are fixed relative to the stator, the sensors being arranged in notches which delimit successive stator teeth and have large casing faces which extend on tangential planes of the magnetic stator mass, such that the sensors detect only a radial component of the magnetic field inside the magnetic stator mass.

According to a particular characteristic, the device for determination additionally comprises a sensor-holder which is arranged on a circumferential part of the stator, and has a radial cross-section substantially in the form of an "L", a first wing of the sensor-holder extending on a transverse plane outside the stator, and a second wing extending inside the stator, along generatrices of the stator.

According to another particular characteristic, the second wing of the device for determination comprises a plurality of tongues which encompass the sensors, and can be inserted in the notches.

According to yet another particular characteristic, the first wing comprises at least two centring studs which cooperate with centring orifices in the circumferential part, and at least two oblong holes which receive securing screws on the circumferential part.

According to a particular embodiment, there are three sensors, and the sensors are for example Hall-effect sensors.

According to another particular embodiment, the rotor comprises permanent magnets in a flux concentration configuration.

According to yet another particular characteristic, the stator windings have ends which are connected by an interconnection ring, and the device for determination is secured on the interconnection ring and/or on the magnetic stator mass.

According to yet another particular characteristic, the device for determination comprises apertures which leave a passage for the said ends.

According to yet another particular embodiment, the rotor has open poles.

According to yet another particular embodiment, the permanent magnets are constituted by ferrite.

These few essential specifications will have made apparent to persons skilled in the art the advantages provided by the electric motor according to the invention, equipped with the device for determination of an angular position and/or the speed of rotation of a rotor as previously described, in comparison with the prior art.

The detailed specifications of the invention are given in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

According to a preferred embodiment of the invention, the electric motor in question is designed to be coupled to the clutch of a hybrid vehicle.

Figure 1:
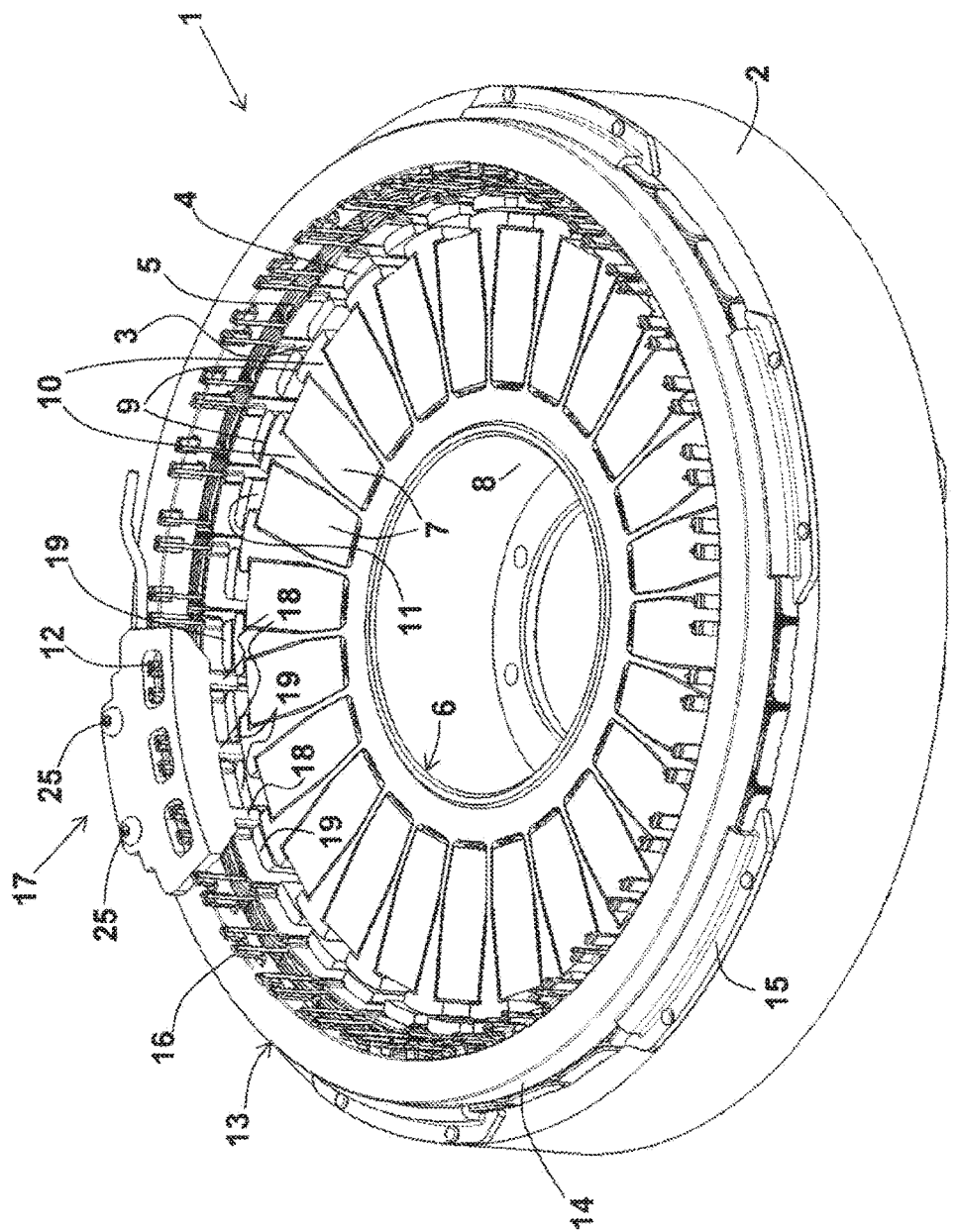
FIG. 1 is a view in perspective of a polyphase electrical machine according to the invention provided with a device for determination of an angular position and/or the speed of rotation of a rotor.

As shown clearly in FIG. 1, this motor has the general form of a flattened cylinder with a relatively low height in comparison with its outer diameter, which is adapted to that of the clutch.

This outer diameter corresponds to that of the magnetic stator mass 2 of the motor 1, in which radial notches 3 delimit stator teeth 4 on which stator windings 5 are arranged.

In this embodiment, the rotor 6 is a rotor with permanent magnets 7 in a flux concentration configuration.

These permanent magnets 7 are distributed regularly between a peripheral part and a central part of a magnetic rotor mass 8, such as to form a plurality of alternating North poles and South poles 9.

The rotor 6 represented is of the so-called "open pole" type, i.e. two consecutive polar sections 10 are separated by an opening 11 in the peripheral part of the magnetic rotor mass 8.

Alternatively, the rotor 6 is of the so-called "closed pole" type.

In a known manner, for the purpose of maximising the volume of the permanent magnets 7, in particular when they are constituted by ferrite, on the central part side of the rotor 6 these magnets are in the form of a wedge.

The magnetic stator 2 and rotor 8 masses are produced in a conventional manner, with sets of metal plates.

Stator currents pass through the stator windings 5 and create rotary magnetic fields which drive the rotor 6.

For this purpose, the ends 12 of the stator windings 5 are connected electrically in the appropriate manner by an interconnection ring 13.

This interconnection ring 13 comprises a housing 14 which is secured by means of flanges 15 on the magnetic stator mass 2, which accommodates conductive tracks which provide a specified interconnection pattern, and has on its exterior connection lugs 16 on which the ends 12 of the stator windings 5 are welded.

Figure 2:
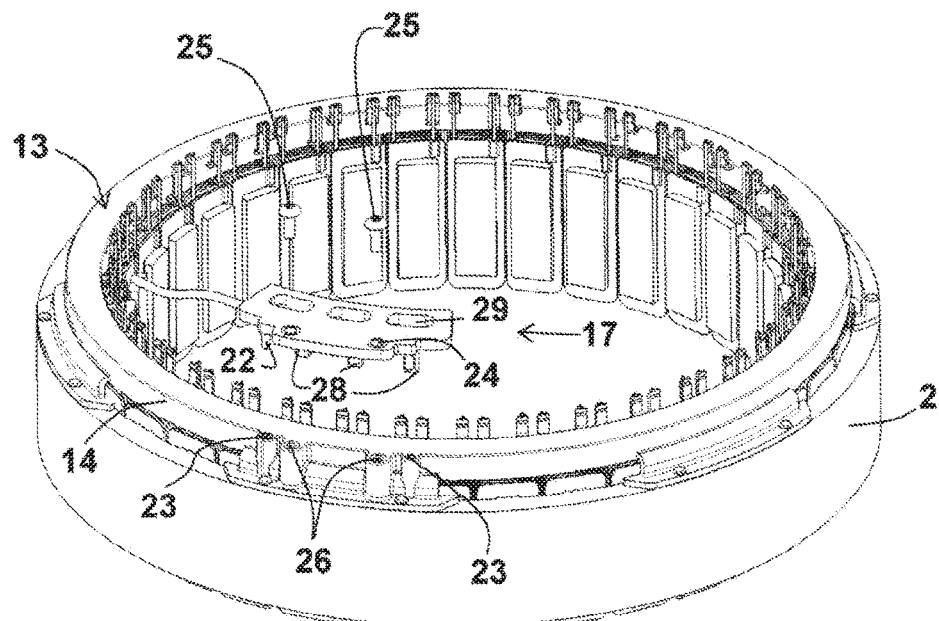
FIG. 2 is an exploded view of the stator and of the device for determination of an angular position and/or the speed of rotation of a rotor according to the invention.

The control of the stator currents is based on the information provided by the device for determination of an angular position and/or the speed of rotation of a rotor 17 according to the invention, which is arranged on a circumferential part of the stator 2, 5, 13, as shown clearly in FIGS. 1 and 2.

In a known manner, this device for determination of an angular position and/or the speed of rotation of a rotor 17 comprises magnetic field sensors 18 which are fixed relative to the stator 2, 5, 13, and emit first signals, on the basis of which external processing means (not represented—situated for example in the inverter) supply second signals which are representative of the angular position of the rotor 6 relative to the stator 2, 5, 13.

In the preferred embodiment of the invention represented, the device 17 makes it possible to arrange three Hall-effect sensors 18 very precisely inside the magnetic stator mass 2, such that the first signals are representative only of the magnetic leakage field of the rotor 6.

Figure 4A:
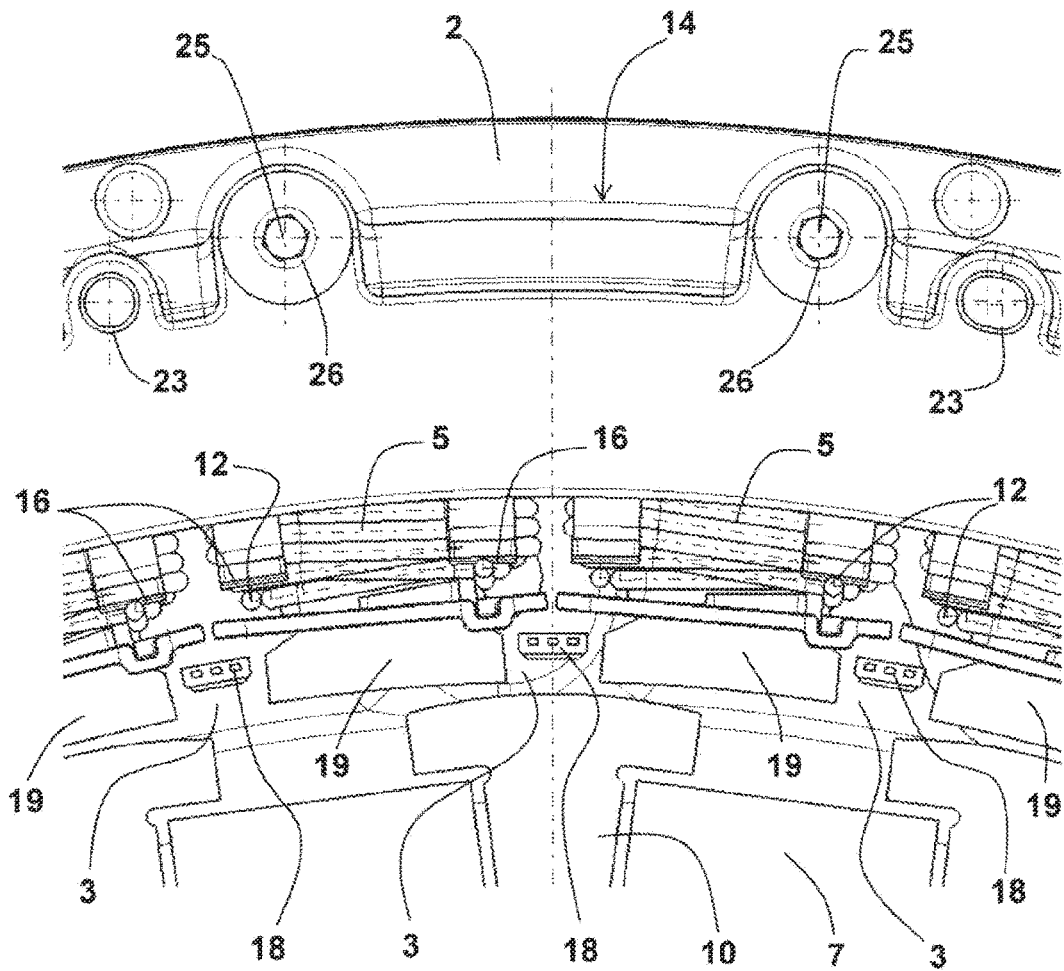
FIGS. 4a and 4b are respectively transverse and radial views in partial cross-section of a circumferential part of the stator of the motor on which there is arranged the device for determination of an angular position and/or the speed of rotation of a rotor according to the invention.

As shown clearly in FIG. 1, and better in FIG. 4a, the three sensors 18 are arranged in notches 3 which delimit successive stator teeth 19.

This particular location of the sensors 18 makes it possible to simplify the subsequent processing, in particular by software after acquisition, of the first signals which they emit.

Figure 3:
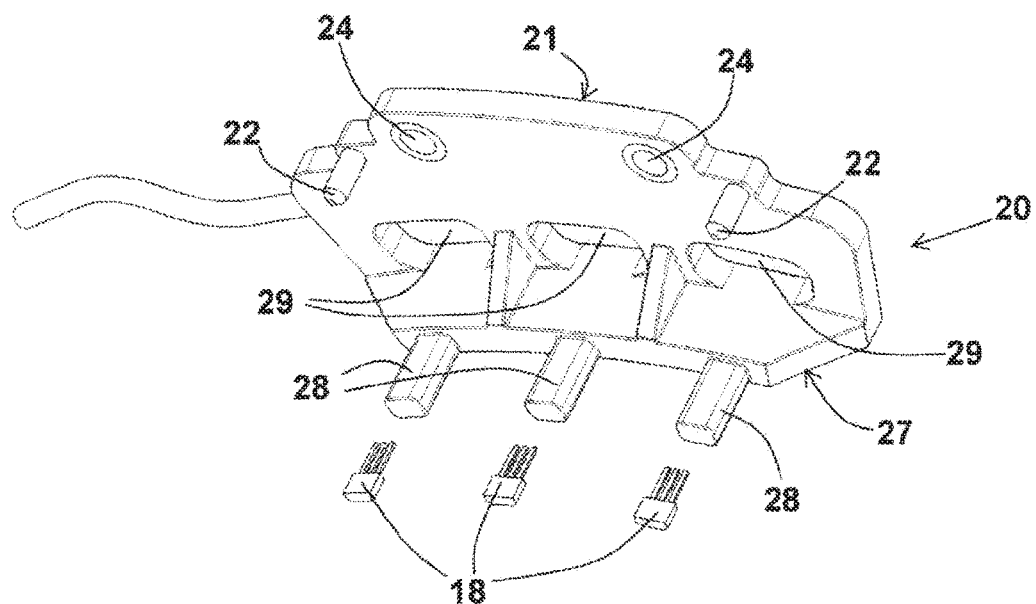
FIG. 3 is a detailed exploded view of the device for determination of an angular position and/or the speed of rotation of a rotor according to the invention.
Figure 4B:
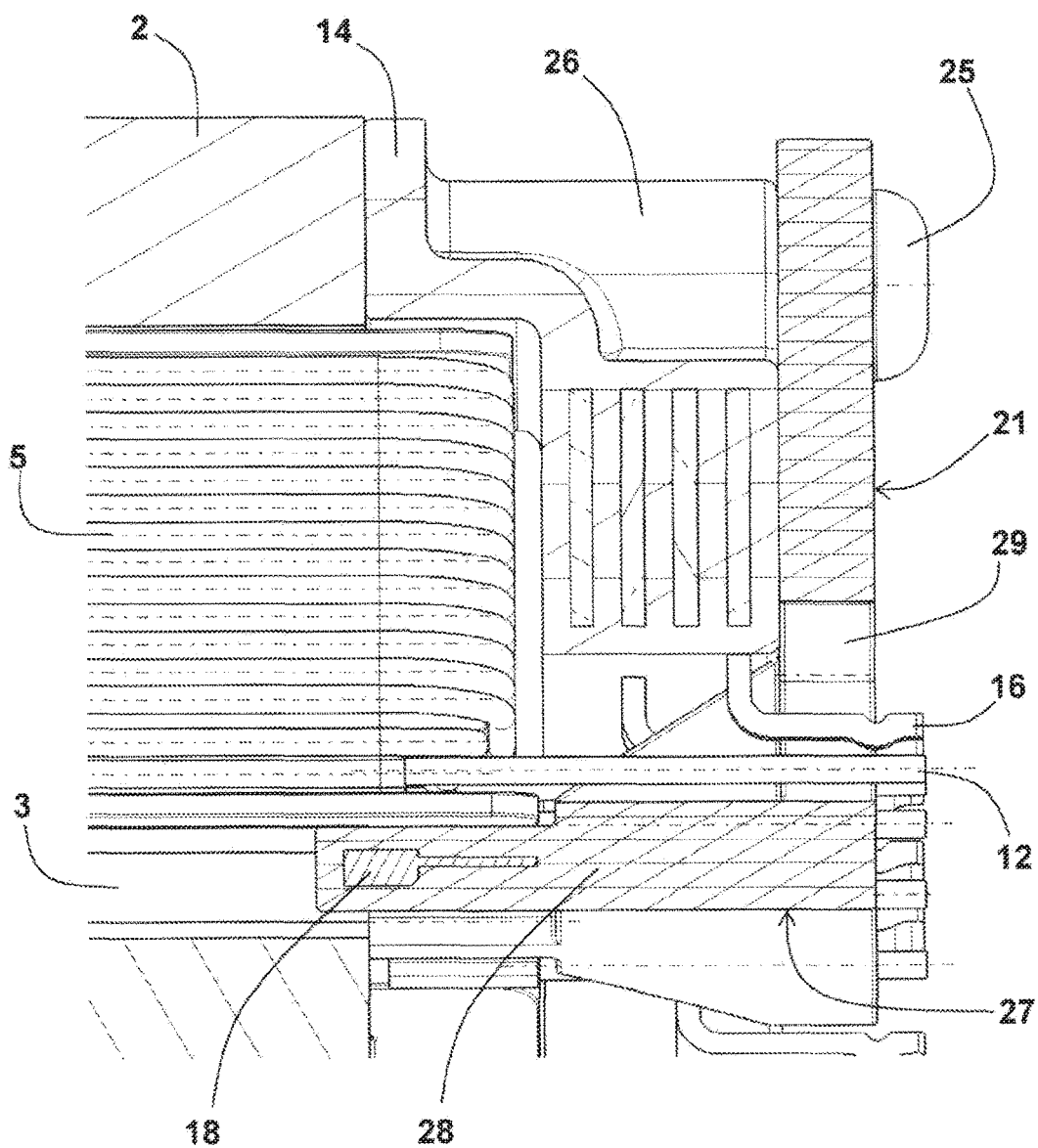

When the device 17 is placed on the stator 2, 5, 13, the precise positioning of the sensors 18 between the successive stator teeth 19 is obtained by means of a sensor-holder 20 which has a radial cross-section substantially in the form of an "L", as shown clearly in FIG. 3, and better in FIG. 4b.

A first wing 21 of the sensor-holder 20, which extends after being fitted on a transverse plane of the motor 1, comprises two centring studs 22 which cooperate with centring orifices 23 in the housing 14 of the interconnection ring 13.

This first wing 21 also comprises two oblong holes 24 which receive screws 25 for securing of the sensor-holder 20 in threaded bores 26 in the housing 14, whilst complying with the indexing provided by the centring studs 22.

A second wing 27 of the sensor-holder 20, which extends after being fitted inside the stator mass 2 along the generatrices, comprises three tongues 28 which extend in the notches 3, and each comprise one of the three sensors 18.

A Hall-effect sensor 18 is an electronic component which is mostly in the form of a small flat parallelepiped casing comprising three connection wires on one of radial (or first) faces of the casing, in the so-called "through" versions, as opposed to the SMC (Surface-Mounted Component) versions.

Two of these connection wires are necessary for the electrical supply of the component, and on the third there is available a voltage which is proportional to the component of the magnetic field perpendicular to orthoradial (or second) faces of the casing.

As shown clearly in FIGS. 4a and 4b, the orthoradial faces of the casings of the Hall-effect sensors 18 extend on tangential planes of the stator mass 2, which is orthogonal to the radial direction; thus, the sensors detect only a radial component of the magnetic field inside the stator mass 2.

For the purpose of obtaining a compact device 17, i.e. which does not increase the height of the stator 2, 5, 13, the device 17 comprises apertures 29 which make it possible at the connection lugs 16 and at the ends 12 of the stator windings 5 to pass through the first wing 21 of the sensor-holder 20.

A specific embodiment of a polyphase electrical motor 1 comprising a device of this type for determination of an angular position and/or the speed of rotation of a rotor 17 is for example a 25 to 50 kW motor for applications in motor vehicles of the so-called mild-hybrid type.

This motor 1 thus benefits from a definite competitive advantage, since the device for determination of an angular position and/or the speed of rotation of a rotor 17 which it comprises is inexpensive to mass-produce, easy to install without a complex alignment procedure, and ensures efficient retention of the sensors 18.

It will be appreciated that the invention is not limited simply to the above-described preferred embodiments.

In particular, as an alternative, the permanent magnets 7 are advantageously constituted by a plurality of juxtaposed bars with a rectangular cross-section.

As an alternative, magnetic field sensors of the magneto-resistive type replace the Hall-effect sensors 18.

Other embodiments based on a number of sensors 18, a number of poles 9, or a form factor of the motor 1 different from those specified or represented, would not be outside the scope of the present invention, provided that they are derived from the following claims.

The invention claimed is:

1. A polyphase electric motor (1) of a motor vehicle, comprising:
a rotor (6);
a stator (2, 5, 13) surrounding said rotor (6), and comprising a plurality of stator windings (5) around stator teeth (4, 19) delimited by notches (3) in a magnetic stator mass (2); and
a determination device for determination of at least one of an angular position (17) and a speed of rotation of said rotor (6), said determination device comprising a plurality of magnetic field sensors (18) fixed relative to said stator (2, 5, 13), said magnetic field sensors (18) being arranged in said notches (3) delimiting the successive stator teeth (19) and having orthoradial casing faces extending on tangential planes of said magnetic stator mass (2), such that said magnetic field sensors (18) detect only a radial component of a magnetic field inside said magnetic stator mass (2);
said rotor (6) comprising permanent magnets (7) in a flux concentration configuration;
said stator windings (5) have ends (12) connected by an interconnection ring (13);
said determination device secured on at least one of said interconnection ring (13) and said magnetic stator mass (2);
said determination device comprises apertures (29) leaving a passage for said ends (12) of said stator windings (5).

2. A polyphase electric motor, comprising:
a rotor (6);
a stator (2, 5, 13) surrounding said rotor (6), and comprising a plurality of stator windings (5) around stator teeth (4, 19) delimited by notches (3) in a magnetic stator mass (2); and
a determination device for determination of at least one of an angular position (17) and a speed of rotation of said rotor (6), said determination device comprising a plurality of magnetic field sensors (18) fixed relative to said stator (2, 5, 13), said magnetic field sensors (18) being arranged in said notches (3) delimiting the successive stator teeth (19) and having orthoradial casing faces extending on tangential planes of said magnetic stator mass (2), such that said magnetic field sensors (18) detect only a radial component of a magnetic field inside said magnetic stator mass (2);
said determination device additionally comprising a sensor-holder (20) arranged on a circumferential part of said stator (2, 5, 13), and having a radial cross-section substantially in the form of an "L", a first wing (21) of said sensor-holder (20) extending on a transverse plane outside said stator (2, 5, 13), and a second wing (27) extending inside said stator (2, 5, 13) along generatrices of said stator (2, 5, 13).

3. The polyphase electric motor according to claim 2, wherein said second wing (27) of said determination device comprises a plurality of tongues (28) which encompass said magnetic field sensors (18), and configured to be inserted in said notches (3).

4. The polyphase electric motor according to claim 2, wherein said first wing (21) comprises at least two centering studs (22) which cooperate with centring orifices (23) in said circumferential part, and at least two oblong holes (24) which receive securing screws (25) on said circumferential part.

5. The polyphase electric motor according to claim 1, wherein said determination device comprises three of said magnetic field sensors (18).

6. The polyphase electric motor according to claim 1, wherein said magnetic field sensors (18) are Hall-effect sensors.

7. The polyphase electric motor according to claim 1, wherein said rotor (6) has open poles.

8. The polyphase electric motor according to claim 1, wherein said permanent magnets (7) are constituted by ferrite.

9. The polyphase electric motor according to claim 2, wherein said determination device comprises three of said magnetic field sensors (18).

10. The polyphase electric motor according to claim 3, wherein said determination device comprises three of said magnetic field sensors (18).

11. The polyphase electric motor according to claim 4, wherein said determination device comprises three of said magnetic field sensors (18).

12. The polyphase electric motor according to claim 2, wherein said magnetic field sensors (18) are Hall-effect sensors.

13. The polyphase electric motor according to claim 3, wherein said magnetic field sensors (18) are Hall-effect sensors.

14. The polyphase electric motor according to claim 4, wherein said magnetic field sensors (18) are Hall-effect sensors.

15. The polyphase electric motor according to claim 2, wherein said rotor (6) comprises permanent magnets (7) in a flux concentration configuration.

16. The polyphase electric motor according to claim 3, wherein said rotor (6) comprises permanent magnets (7) in a flux concentration configuration.

17. The polyphase electric motor according to claim 4, wherein said rotor (6) comprises permanent magnets (7) in a flux concentration configuration.

18. A polyphase electric motor (1) of a motor vehicle, comprising:

a rotor (6);

a stator (2, 5, 13) surrounding said rotor (6), and comprising a plurality of stator windings (5) around stator teeth (4, 19) delimited by notches (3) in a magnetic stator mass (2); and a determination device for determination of at least one of an angular position (17) and a speed of rotation of said rotor (6), said determination device comprising a plurality of magnetic field sensors (18) fixed relative to said stator (2, 5, 13), said magnetic field sensors (18) being arranged in said notches (3) delimiting the successive stator teeth (19) and having orthoradial casing faces extending on tangential planes of said magnetic stator mass (2), such that said magnetic field sensors (18) detect only a radial component of a magnetic field inside said magnetic stator mass (2).

* * * * *